Figure 2:
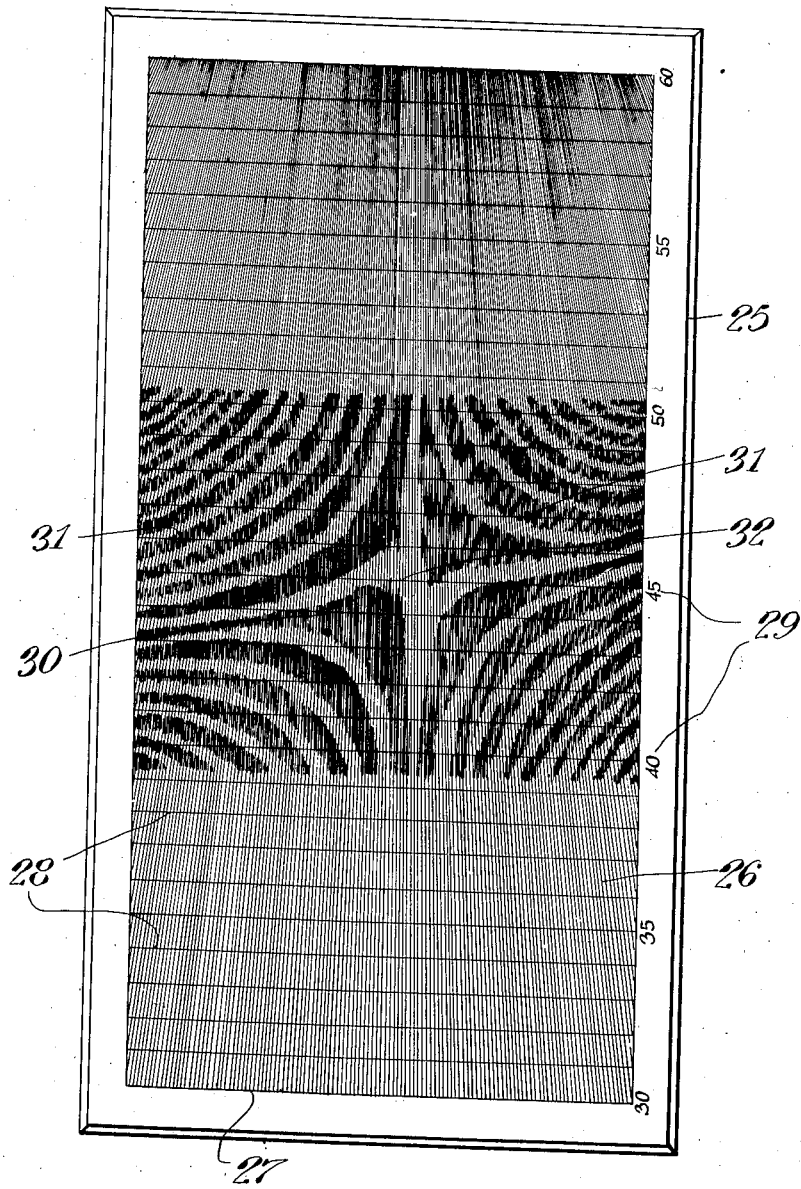

Nov. 10, 1931.　　　　　H. P. LUHN　　　　　1,831,536
MEASURING AND EXAMINING DEVICE
Filed April 11, 1929　　2 Sheets-Sheet 1
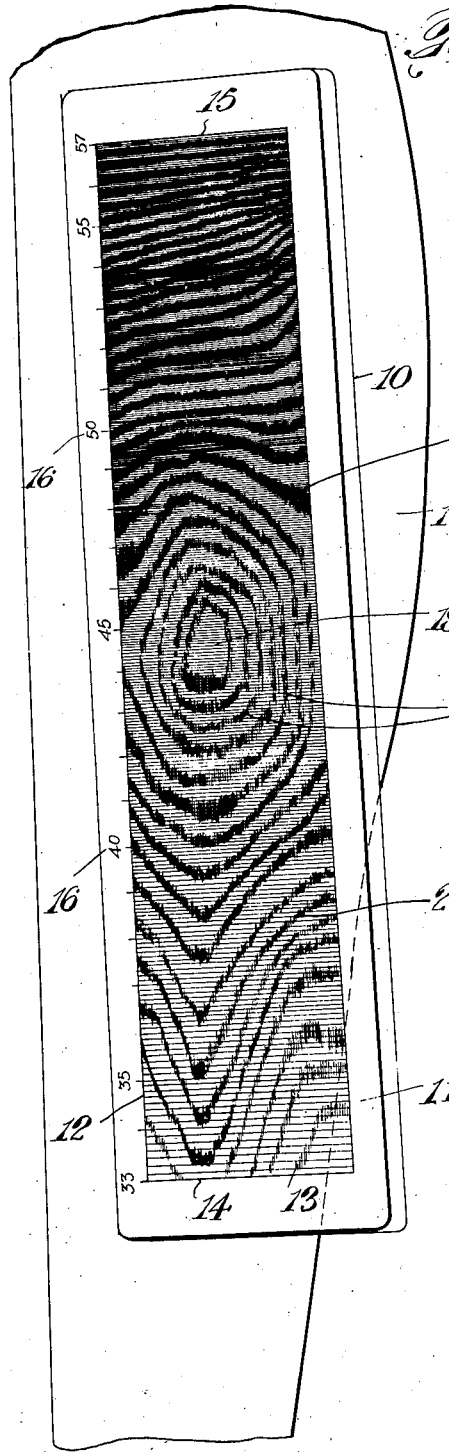
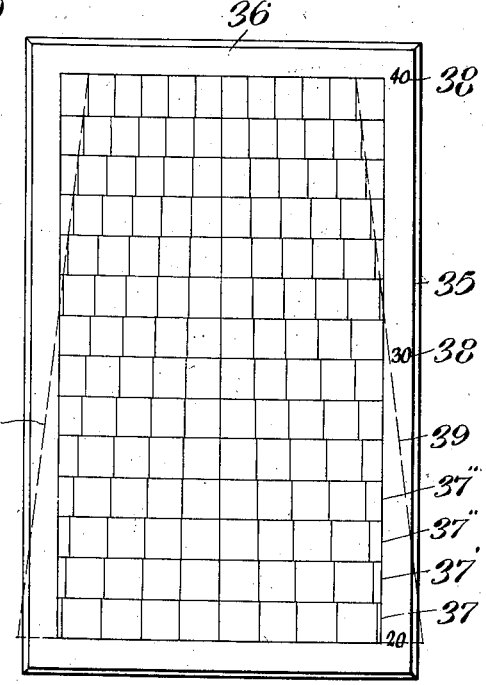

Nov. 10, 1931.  H. P. LUHN  1,831,536
MEASURING AND EXAMINING DEVICE
Filed April 11, 1929   2 Sheets-Sheet 2

Patented Nov. 10, 1931

1,831,536

UNITED STATES PATENT OFFICE

HANS P. LUHN, OF READING, PENNSYLVANIA, ASSIGNOR TO TEXTILE MACHINE WORKS, OF WYOMISSING, PENNSYLVANIA, A CORPORATION OF PENNSYLVANIA

MEASURING AND EXAMINING DEVICE

Application filed April 11, 1929. Serial No. 354,370.

This invention relates to measuring and examining devices, and relates more particularly to gauges for measuring the spacing of and for determining the accuracy of lines on the drawings, threads in a fabric, or the like, by interference between the article to be measured and lines on the measuring device.

The primary object of my invention is to provide a simple measuring and examining gauge by means of which the spacing of lines may be quickly and easily measured and their accuracy determined by an unskilled person with a precision amply sufficient for ordinary commercial purposes.

Other objects and advantages of my invention will be apparent from the following description, taken in conjunction with the accompanying drawings, in which Figure 1 is a perspective view of one form of measuring and examining gauge according to my invention;

Figure 2 is a plan view of a second form of measuring gauge in accordance with my invention; and Figure 3 is a plan view of still a third embodiment.

Referring more particularly to Figure 1 of the drawings, a measuring gauge 10 is shown comprising a rectangular block 11 of plate glass or other transparent material, having a scale 12 engraved thereon, preferably, although not necessarily, upon the underside of the block. As shown in Figure 1, the scale 12 is formed of a series of straight parallel lines 13 of graduated spacing, the lines 13 being arranged successively closer and closer to each other as one proceeds from the left hand end 14 to the right hand end 15 of the scale. At the end 14 of the scale the spacing of the first line 13 from its neighbor is such that were this spacing to be continued unchanged, there would be thirty-three such lines in a distance of one inch. At the end 15 the spacing of the lines 13 is such that, if continued, fifty-seven of the lines would be included within a distance of one inch. At intermediate points along the scale, the spacing of the lines is graduated as shown by the scale numerals or calibrations 16. It will be understood that the values illustrated are purely arbitrary, and that the particular spacing of each scale should be chosen with due regard to the type of article on which the scale is to be used.

In the ideal embodiment of my invention, the graduated spacing of the lines 13 would be such that the lines grow closer and closer together in the same ratio as one proceeds from one end of the scale to the other. As a practical matter, however, the expense of engraving the lines in this manner is so high, and the resulting increase in accuracy so slight, that it is sufficient to have a few lines equally spaced apart at the proper spacing, and then a few lines equally spaced apart at a slightly closer spacing and so on along the scale.

My invention is shown in Figure 1 as applied to measuring the number of courses per inch of a stocking 17 and determining the accuracy of its fabric. For this purpose, the stocking may be spread out flat upon a suitable table and the gauge placed upon the stocking. By sliding the gauge along the stocking a moving interference pattern consisting of spaced dark bands is set up and is readily visible to the naked eye. By sliding the gauge in one direction, the bands will apparently flow from either end of the scale towards a merging point. By sliding the gauge in the opposite direction, the bands appear to start from a source point and flow in opposite directions therefrom towards the ends of the scale. The merging point or source point may be readily singled out, and is the point from which the reading should be taken. By noting the position of this reading point with respect to the calibrations 16, the number of courses per inch of the stocking may be instantly determined. If desired, the reading may be made while the gauge is stationary. This is not quite so rapid a procedure, but is possibly a shade more accurate. Figure 1 shows the appearance of the interference bands when the gauge is stationary upon the stocking. The point 18 is the reading point in this figure, and at the portion of the stocking underlying this point, the lines of the scale coincide exactly or almost exactly with the threads of the stocking, forming a relatively large light area in which substantially only the lines of the scale are visible. On either side of this area in which substantially only the lines of the scale are visible, appear spaced dark bands which are caused by threads of the stocking lying between the lines of the scale. Were the fabric of the stocking exactly straight and the threads exactly parallel, as are the lines of the scale in the embodiment of my invention shown in Figure 1, these dark bands would also be straight and parallel to one another. However, as shown in Figure 1, due to the slight irregularity of the threads of that stocking, the light area where the threads and the lines of the scale coincide is surrounded by a plurality of roughly circular bands 19 and the more remote bands 20 are wavy in form. The number of threads per inch of the stocking may be determined simply by reading the calibrations 16 at the point nearest the point 18, which is the center of this light area. In the case illustrated in Figure 1, the stocking 17 has between 44 and 45 threads per inch at the portion under the point 18 and its fabric is of medium accuracy. This is a sufficiently exact reading for all practical purposes, although the reading may be taken more accurately if desired by making a closer inspection. It will be understood that the number of threads per inch and the accuracy of the stocking may vary at different points along its length and readings at various points may be taken very quickly and easily by simply sliding the gauge along the stocking and noting the movement, if any, of the reading point 18 with respect to the scale calibrations 16 as well as the deformation of the bands.

Where the scale is used to measure the spacing of straight parallel lines, for example the spacing of the lines of a line print such as is commonly used in newspaper illustrations, the area which is to be read will appear as a relatively wide light band in which only the lines of the scale are visible. On either side of this wide light area will appear straight spaced dark bands which grow closer and closer together towards the ends of the scale, so that the reading point may be instantly observed. The scale should preferably be so placed on the object that the scale lines are parallel to the lines being measured, and this condition is readily determinable by the appearance of the bands. If the lines on the scale are not substantially parallel to the lines being measured, the dark bands will slant very decidedly across the scale and the scale is simply turned sufficiently so that the bands straighten out.

Instead of having the scale engraved on a transparent block as above described, the block 11 may be made of an opaque material and the scale 12 engraved on the top surface of the block. In such cases it is preferable to have the lines filled in with a material of contrasting color. If the block 11 be of black hard rubber, for example, the lines should be filled in with some white material, or if the block 11 be made of a light colored metal, the lines should be made black. In such case, the fabric or object to be measured would be placed on top of the scale, and obviously must be sufficiently transparent or translucent for the lines of the scale to show through. Similarly, the transparent scale when used with diaphanous objects such as silk stockings, may be placed beneath the object and if desired illuminated by transmitted light from below. Or, if desired, the lines of the gauge may be projected upon the fabric or object to be measured as shadows by placing the gauge between the object and a suitable source of illumination and optical condenser. It is not even necessary that the lines of the scale be straight. If the scale is to be used to measure the spacing of curved lines, the scale lines 13 should be similarly curved. Although my invention is essentially a measuring device, it is not necessary that it be provided with scale calibrations which inform the operator as to the number of the lines being measured per unit of length. If the scale is to be employed simply to classify articles, for example stockings or wire screens, it is sufficient to place a mark on the scale to identify the desired spacing, or two marks to indicate the permissible variation, or the length of the scale might be restricted to the desired range of spacing. Articles falling outside of the desired range could thus be readily detected and disposed of accordingly. It is of course necessary that the graduation of the lines of the scale be initially predetermined to suit the purposes in view. In other words, the particular type of measuring for which the scale is to be employed should be taken into consideration in constructing the scale. The foregoing modifications of my invention are simply illustrative, and other modifications will readily suggest themselves to persons skilled in the art, and are intended to be included within the scope of my invention.

In the form of my invention shown in Figure 2, the transparent gauge 25 is constructed so that the necessary graduated spacing is obtained by means of a plurality of converging lines 26. The lines 26 are so drawn that each pair of lines intercepts the same distance on an arbitrary base line, and that all of the lines 26 would if continued meet at a common point. The actual laying out of the lines 26 may readily be accomplished by marking off a series of equally spaced points on a base line 27 and drawing a line 26 from each one of these points to a suitable point remote from the base line. In the case of the gauge illustrated, this point is beyond the range of the scale. Preferably, but not necessarily, this common meeting point of the lines 26 should lie on the perpendicular bisector of the base line 27 of the scale. From the elementary principles of geometry it will be apparent that any line parallel to the base line 27 will also be divided into a plurality of equal segments by the lines 26. I therefore rule guide lines 28 across the lines 26 parallel to the base line in such position as to intercept a suitable number of lines 26 for each unit of their length. The guide lines 28 are provided along one side of the gauge 25 with calibrations 29 indicating the number of lines 26 intersecting each unit of their length. On the particular scale shown in Figure 2, these markings run from thirty lines per inch at one end to sixty lines per inch at the other end of the scale.

As described in connection with Figure 1 an interference pattern appears when the gauge illustrated in Figure 2 is placed upon a fabric or other lined object. The gauge 25 however will give a different interference pattern than will the gauge 10 with the same object. When the gauge 25 is used to measure the spacing of the lines of a grid comprising a series of uniformly spaced parallel straight lines, an interference pattern 30 is formed as shown in Figure 2. This interference pattern comprises spaced dark bands 31 which are curved in form and assume a hyperbolic shape as shown in the drawings. These hyperbolæ bound a light area 32, the center of which is the reading point. In other words, the reading point is the intersection of the two asymptotes of the four sets of hyperbolæ illustrated. The sliding of the gauge along the grid in one direction will cause one diagonally opposite pair of hyperbolæ to flow together and the other diagonally opposite pair to flow apart. Reversal of the direction of sliding will effect a reversal of the direction of flow of the two diagonally opposite pairs of hyperbolæ. This motion of the dark bands when sliding the gauge with respect to the lines being measured furnishes the easiest way of making a speedy reading. In the instance shown in Figure 2, the lines being measured having a spacing of about forty-five to the inch.

Figure 3 shows still another modification of my invention in which a similar result is achieved by having a plurality of rows of lines, each row having its lines uniformly spaced, but the spacing of the lines of each row varying progressively. In this figure, the scale 35 comprises a transparent block 36 having thereon a plurality of rows of lines 37, 37', 37'', etc. In each of these rows of lines, the spacing of the individual lines is uniform, but the spacing of the lines of the successive rows is graduated. For example, if the row 37 has twenty lines to the inch, the row 37' may have twenty-one lines to the inch, the row 37'' twenty-two lines to the inch, and so forth through the successive rows. It will be understood that many of the lines of the rows 37, etc., have been omitted from the scale shown in Figure 3 in order to simplify the drawings. The calibrations 38 indicate the spacing of the respective rows. Although it is not essential to do so, the rows 37, etc., may advantageously be of such width in proportion to the spacing of the lines in each row, that the upper or lower end of each line of each row may be joined to the same end of the corresponding lines of the other rows by straight lines such as the dotted lines 39. Also it is preferable to make the gauge symmetrical as shown in Figure 3 by having one of the lines of each row lie on the perpendicular bisector of the base line. The bands which appear when this type of scale is placed upon a fabric such as a stocking are very similar to those shown in Figure 2 and are read in the same manner.

It will be apparent that the embodiments of my invention shown in Figures 2 and 3 may be varied in many details in ways similar to those discussed in connection with Figure 1, and by the same token, various other embodiments of my invention may readily be developed by those skilled in the art. I desire to be limited, therefore, only by the prior art and the scope of the appended claims.

The term "similar lines" where used in the appended claims is intended to mean lines of corresponding contour located adjacent one another, and is intended to include either parallel straight lines or curved lines.

I claim:

1. A measuring device comprising a system of similar lines of predetermined form and graduated spacing disposed along and substantially perpendicular to a longitudinal axis, the spacing of said lines along said axis varying progressively and substantially uniformly from one end of said axis to the other, and said lines being adapted to produce a pattern of definite and measurable characteristics by interference with a set of lines or the like to be measured.

2. A measuring device comprising a system of parallel lines of predetermined graduated spacing disposed along and substantially perpendicular to a longitudinal axis, the spacing of said lines along said axis varying progressively and substantially uniformly from one end of said axis to the other, and said lines being adapted to produce a pattern of definite and measurable characteristics by interference with a set of lines or the like to be measured.

3. A measuring instrument comprising a device having thereon a series of lines arranged in parallelism along a longitudinal axis which is substantially perpendicular to said lines, said lines being separated from one another by successively varying distances which progressively increase a substantial ly uniform amount from one end of said series to the other; said series of lines effecting the appearance of a pattern of measurable characteristics when in superimposed relation with another series of lines or the like to be measured.

In testimony whereof, I have signed my name to this specification this 9th day of April, 1929.

HANS P. LUHN.